May 29, 1951 — W. S. PRAEG — 2,554,752
METHOD OF SHAVING GEARS
Filed July 31, 1947 — 2 Sheets-Sheet 1

INVENTOR.
WALTER S. PRAEG
BY Whittemore, Hulbert & Belknap
ATTORNEYS

INVENTOR.
WALTER S. PRAEG
ATTORNEYS

Patented May 29, 1951

2,554,752

UNITED STATES PATENT OFFICE 2,554,752

METHOD OF SHAVING GEARS

Walter S. Praeg, Detroit, Mich., assignor to National Broach & Machine Company, Detroit, Mich., a corporation of Michigan Application July 31, 1947, Serial No. 765,009

2 Claims. (Cl. 90—1.6)

The present invention relates to finishing gears and more particularly to the method of finishing gears by rolling the gear in mesh with a gear-like tool, preferably a cutting tool, with the axes of the gear and tool crossed at a small angle and in which a relative traverse between the gear and tool is effected in a plane parallel to the axes of both gear and tool and in a direction in such plane making an angle of less than 60° with the axis of said gear.

Crossed axes gear finishing as previously practiced in commercial gear finishing involved the meshing of a gear and gear-like tool, such for example as a shaving cutter of the type disclosed in Drummond Patent 2,126,178, the rotation of the gear and tool in mesh by positively rotating either the gear or tool and driving the other part thereby, and effecting a relative traverse in a direction parallel to the axis of the gear so as to distribute the finishing action of the tool longitudinally from end to end of the teeth of the gear. Alternatively, a relative traverse in a direction perpendicular or substantially perpendicular to the axis of the gear has been employed, but this method was unsatisfactory when the finishing tool was a shaving cutter unless special precautions were taken to avoid leaving cutter marks on the teeth of the gear and the introduction of surface irregularities due to the separation of the cutting edges on the teeth of the cutter.

The patent literature also includes a suggestion that relative traverse between a gear and gear-like tool meshed at crossed axes could be in a direction oblique to the axes of both gear and tool. While this suggestion has been before the art for many years it was never adopted for the reason that as broadly suggested it included a great many inoperable conditions and was not such a suggestion as could be adopted without a great deal of further experimentation. Aside from the fact that this suggestion of relatively oblique traverse included a great many inoperable conditions, it further completely failed to appreciate certain definite and outstanding advantages which are attained when the relative traverse between the gear and tool is carried out between certain restricted limits and under certain restricted conditions of operation.

The present invention teaches the qualifying conditions which must be observed in order to obtain certain new and totally unexpected advantages which flow from a method of shaving gears referred to herein as "diagonal traverse."

It has been discovered that when carried out within the boundaries of the limitations set forth herein, the finishing of gears by diagonal traverse results in the possibility of finishing gears in a fraction of the time previously required and further results in better control of limits as to tooth form and lead as well as providing a much freer cutting operation even though the angle at which the axes of gear and tool are crossed is reduced in some cases to smaller angles than previously found to be operable.

The reasons why these manifold advantages result from diagonal traverse are not thoroughly understood, but a period of experimentation has resulted in the possibility of prescribing the method of operation with such particularity as to insure satisfactory results when the limitations are observed.

With the foregoing general remarks in view, it is an object of the present invention to provide a method of shaving gears employing diagonal traverse.

It is a further object of the present invention to provide a method of shaving gears in which the traverse angle as subsequently defined is between 10° and 60° and preferably between 10° and 45°.

It is a further object of the present invention to provide a method of shaving helical gears with diagonal traverse in which the direction of traverse is against the helix of the teeth of the gear.

It is a further object of the present invention to provide a method of shaving gears with diagonal traverse in which the axes of the gear and tool may be crossed at a very small angle.

It is a further object of the present invention to provide a method of crown shaving gears by diagonal traverse in which a finishing tool is employed having its teeth modified only throughout a portion of their length corresponding to the active width of the tool.

Other objects and features of the invention will become apparent as the description proceeds, especially when considered in conjunction with the accompanying drawings, wherein.

Figure 1:
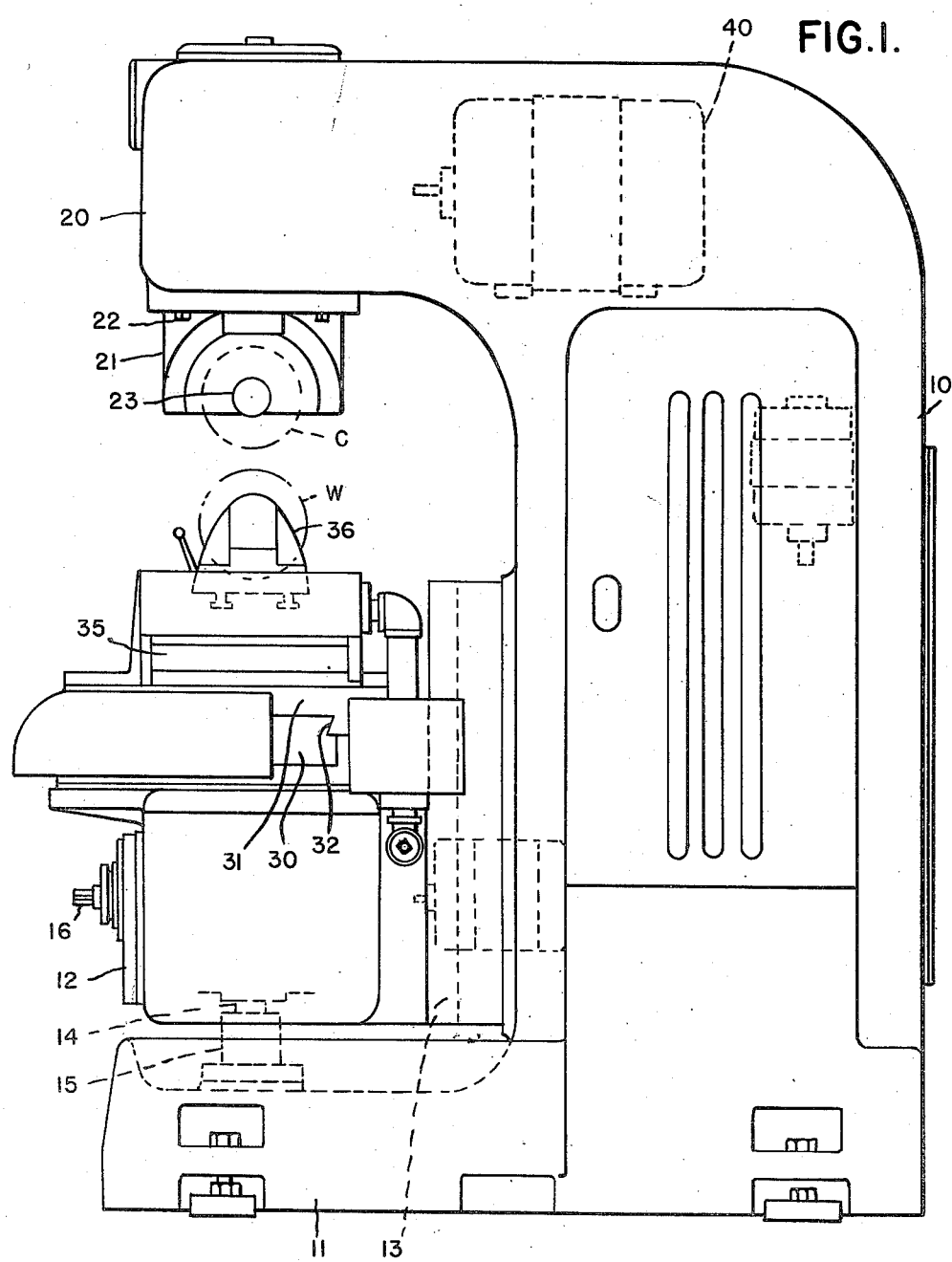
Figure 1 is a side elevation of the machine adapted to carry out the herein disclosed method.

In order that the method may be fully understood, attention is first directed to Figure 1 in which a gear finishing machine is illustrated. This machine comprises a main frame 10 having a forwardly extending projection 11 at its base, above which is mounted a knee 12 vertically slidable in ways 13. Vertical adjustment of the table 12 is accomplished through the medium of a feed screw 14 cooperating with a feed nut, indicated at 15, which is carried by the forwardly projecting portion 11. Suitable means, such for example as bevel gears (not shown), are provided for rotating the vertical feed screw 14, these means including an operating shaft having a squared end 16 for engagement by a hand tool for adjusting the height of the knee 12.

At the top of the frame 10 is a forwardly extending overhanging portion 20 from which depends a cutter head 21. The cutter head 21 is angularly adjustable about a vertical axis and is adapted to be clamped in adjusted position by suitable means, such for example as bolts 22. The cutter head 21 includes a spindle, indicated at 23, for mounting a tool C, which as previously stated may be a cutting tool or it may be a gear-like lap.

In the event that a cutting tool is employed, the flanks of the teeth are formed with grooves providing intermediate lands, the upper surfaces of which occupy the tooth surface and serve as guiding surfaces, the lands having sharp cutting corners at their edges. On the other hand, a lap may be employed which is of gear-like form having teeth conjugate to the teeth of the gear to be finished. This lap may be formed of cast iron or equivalent material and depends upon the use of abrasive to perform its function of removing metal from the teeth of the gear. In the following description the terms "tool" and "cutter" are used interchangeably and both are to be considered as including a so-called shaving cutter disclosed in the Drummond patent or a lap as described above.

Mounted on the knee 12 for adjustment about a vertical axis are a lower plate 30 and an upper plate 31 provided with rectilinear ways 32 therebetween. Plates 30 and 31 are adjustable as a unit about the vertical axis referred to and it will be understood that this adjustment changes the direction of the rectilinear ways 32 with respect to the machine. Suitable traversing mechanism (not shown) is provided between plates 30 and 31 and may conveniently take the form of a conventional feed nut depending from the upper plate 31 and cooperating with a feed screw rotatably mounted on the lower plate 30. Details of this mechanism form no part of the present invention, but a suitable construction is illustrated in copending application Serial No. 694,590 of Kenneth J. Davis, which is assigned to the assignee herein.

Angularly adjustable about a vertical axis on the upper plate 31 is a work supporting table 35 carrying head and tailstocks, one of which is indicated at 36, between which the work gear W is mounted for free rotation.

Means are provided for effecting positive rotation of the tool C in any position of angular adjustment of the tool head 21 with respect to the machine. This means is not illustrated in detail herein but includes a motor 40. The driving connections between the motor 40 and the tool C may be of any desired type, such for example as those illustrated in prior Drummond Patent 2,270,421.

In the present machine it is contemplated that the orientation of the table 35 with respect to the machine shall not be changed and that the direction of traverse of the work gear W may be selected by an appropriate adjustment of the plates 30 and 31 so as to cause their intermediate ways 32 to extend in the desired direction of traverse. The tool C is adjusted so as to have proper meshing relation with the work gear W by angular adjustment of the tool head 21. Normally the helix angles of the tool C and the work piece W differ by a few degrees so that the axes of the tool and gear are crossed as viewed in a horizontal plane.

In the operation as will be more specifically set forth later the cutter is rotated at relatively high speed so as to produce a pitch line linear speed of between 200 and 1000 feet per minute and excellent results are obtained when this linear speed is in the neighborhood of 500 feet per minute. The relative traverse which in the machine illustrated in Figure 1 results from relative movement between the plates 30 and 31 along the ways 32 is carried out at a rate of between two and ten inches a minute and excellent results have been attained when this relative traverse is in the neighborhood of five inches a minute. When diagonal traverse is employed to finish the teeth of a helical gear it is in most cases found that relative traverse should be in a direction which is described herein as "against the helix angle of the gear."

Figure 2:
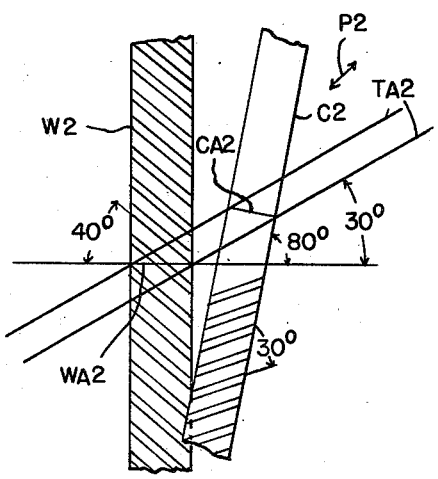
Figure 2 is a diagrammatic view illustrating the preferred relationship between a gear and cutter and the direction of relative traverse.

Referring now to Figure 2, there is illustrated at W2 a work gear which is 40° right-hand helix. At C2 there is illustrated a tool adapted to mesh with the gear W2 at a crossed axes angle of 10°, and accordingly this tool is a 30° left-hand helix angle member. The set-up illustrated in Figure 2 involves relative traverse between the tool C2 and the gear W2 in the direction of the lines TA2. As will be observed, these lines make an angle of 30° with the axis of the gear and this angle is referred to as the traverse angle. The two lines TA2 as drawn pass through the ends of the gear axis WA2 and the tool axis CA2 and accordingly as the relative traverse is effected in the direction of the lines TA2 the teeth of the gear W2 are completely machined from end to end by the teeth of the tool or cutter C2. In Figure 2 the parts are shown out of mesh for clarity, and in actual practice the traverse stroke may be only slightly greater than sufficient to cause the point of crossing of the axes of the gear and tool to shift longitudinally from end to end of the teeth of the gear.

Reference was previously made to the direction of relative traverse being against the helix angle of the gear. This requires that the direction of relative traverse shall occupy those two of the four quadrants defined by the axis of the gear and the plane of the gear which contains the line P2 which is perpendicular to the length of the engaged gear teeth. The remaining two quadrants, as a corollary, contain lines which may be drawn parallel to the length of the engaged teeth of the gear W2. Traverse in these last two mentioned quadrants would be referred to "along the helix angle of the gear." It has been found that relative traverse between the gear and tool in a direction along the helix angle of the gear tends to result in loss of control of the tooth form developed by the tool on the teeth of the gear. The most serious loss of control appears to be in reproduction of tooth profile and a true involute on the teeth of the tool fails to produce a conjugate involute on the teeth of the gear.

Figure 3:
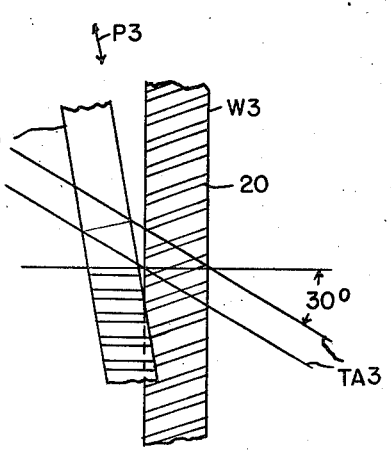
Figure 3 is a diagrammatic view similar to Figure 2 illustrating the preferred relationship between a cutter and gear of different helix angle.

Referring now to figure 3, a similar condition is illustrated, but in this case the gear W3 is illustrated as being a 20° left-hand helix angle member. Again the direction of relative traverse as indicated by the lines TA3 is such as to produce a traverse angle as defined above of 30°. The tool or cutter C3 is designed to mesh with the gear W3 at a crossed axes angle of 10°, and accordingly the tool is a 10° right-hand helix angle member. In this case the quadrants occupied by the direction of traverse TA3 are those indicated by the arrow P3, which as shown is drawn perpendicular to the length of the engaged teeth of the gear W3.

Comparing Figures 2 and 3, it will be observed that in Figure 2 the proper direction of traverse is in the first and third quadrants as described, and in Figure 3, the proper direction of traverse is in the second and fourth quadrants.

Figure 4:
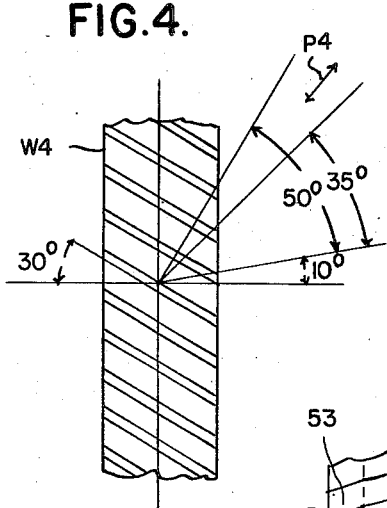
Figure 4 is a diagrammatic view showing a portion of a gear to be finished and indicating the preferred direction and limits of relative traverse.

Figure 4 is a diagram illustrating a generalization of the rule relating to the quadrant occupied by the direction of traverse. In this case there is illustrated a work gear W4 which as illustrated is a 30° right-hand gear. Irrespective of the crossed axes setting or the precise helix angle of the tool employed therewith, the direction of relative traverse between the gear W4 and whatever tool is meshed therewith should occupy the quadrants indicated by the arrow P4. Within this quadrant are drawn lines indicating directions of traverse which would result in traverse angles of 10°, 45° and 60°, respectively.

It has been found that the benefits of diagonal traverse are obtained to the fullest extent without the introduction of disadvantages when the traverse angle as previously defined is between 10° and 45°. In some cases and due to other considerations it may be desirable to employ traverse angles greater than 45°, but in no case should the traverse angle exceed 60°. In the zone between 45° and 60° difficulties appear such as loss of lead, tooth form, tapered teeth, inferior surface finish and the like.

In prior known conventional gear shaving crossed axes settings on the order of 10° to 15° were normally employed and it was found that when the crossed axes setting approached 3° little cutting was obtained and the action of the tool on the gear was primarily a burnishing action. However, for reasons not fully understood, the use of diagonal traverse results in a much freer cutting operation. Diagonal traverse shaving operations have been carried out on commercial gears with a crossed axes setting as low as 3° and exceptionally free cutting has been observed. While certain theoretical reasons for this relatively free cutting action taking place at very small crossed axes with diagonal traverse are deducible, it is believed undesirable to enter into a complicated explanation of such reasons herein. The simple fact that these unexpected and unpredicted results were obtained remains.

Figure 5:
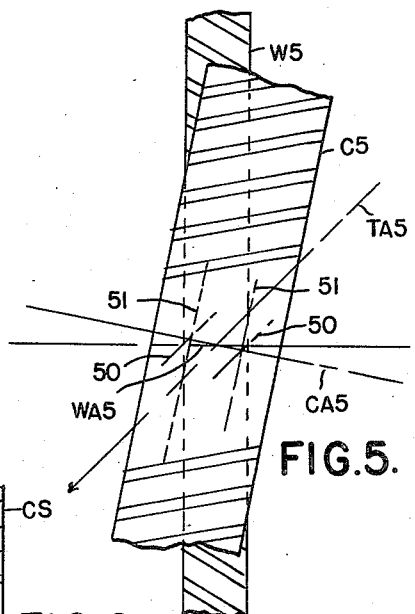
Figure 5 is a diagrammatic view illustrating crowning of gear teeth in accordance with the present method in which less than the entire face width of the cutter is employed.
Figure 6:
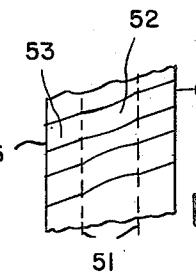
Figure 6 is a fragmentary view of a cutter showing a tooth modified to carry out gear crowning in accordance with the method illustrated in Figure 5.

Referring now to Figures 5 and 6, there are illustrated certain aspects entering into the method of crowning gears by diagonal traverse. Inasmuch as diagonal traverse results in the finishing action on each circular zone of the gear teeth being performed by a specific circular zone on the cutter teeth, it is possible to produce gear teeth which are modified from end to end. Thus, for example, if a gear and tool are operated at diagonal traverse such that one end of the teeth of the tool operate on one end of the teeth of the cutter, the central portion of the teeth of the tool operate on the central portion of the teeth of the gear, and the other end of the teeth of the tool operate on the other end of the teeth of the gear, it will be apparent that if the teeth of the tool are modified so as to be longitudinally concave, they will operate to produce teeth on the gear which are longitudinally convex. Longitudinally convex gear teeth are referred to in the art as "crowned" and exhibit the characteristic of central bearing, and more particularly avoid undesirable, noisy and dangerous end tooth contact even when shaft misalignment is present either in the initial installation or as a result of stress under load.

By a proper selection of diagonal traverse it is possible to employ various face width tools for a single face width gear, and it is accordingly possible in some cases to finish a relatively wide gear with a relatively narrow cutter.

Whether the required width of a tool or the active width of a wider tool is greater or less than the width of a gear being finished depends upon which pair of quadrants the direction of diagonal traverse occupies. As previously stated, optimum results are obtained when the direction of relative traverse occupies the two quadrants defined between the axis and plane of the gear which contains the perpendicular to the engaged teeth of a helical gear. Accordingly, in some cases this consideration requires that diagonal traverse take place in the quadrants which results in the active width of the cutting being less than the face width of the gear. Inasmuch as cutters are normally made in a standard face width, this may result in some cases in the active width of the cutter being substantially less than its full face width. In a particular instance where the face width of the cutter is one inch, the active width may be on the order of a half inch.

In order to impart a desired amount of crown as above described to the teeth of the gear, the reverse amount of crown must be applied to the cutter but as will be apparent it must be present in the active width thereof. If, for example, a crown which would result in a .0010 inch difference in tooth thickness between the ends of the gear tooth and the center thereof were desired, a hollow having a depth of approximately .0005 inch should be provided at the portion of the tool teeth constituting the active width. If, however, this hollow were provided uniformly throughout the entire length of tooth so that there was a difference of .0005 inch from the center of the tooth to a point approximately .250 inch removed therefrom, the actual hollow from one end to the center of the tooth of the tool would be on the order of .0015 inch or greater. This relatively severe modification of the cutter tooth would under some conditions lead to interference between the ends of the tool teeth and the gear which would prevent the desired crowning taking place.

This situation is illustrated in Figures 5 and 6.

Referring now to Figure 5, there is shown a relatively narrow work gear W5 which is illustrated in mesh with a wider tool or cutter C5, the crossed axes relationship being illustrated as on the order of 10°. The gear W5 is shown as being a 30° right-hand gear, and accordingly relative traverse between the gear and tool should occupy the quadrants containing the arrow TA5. The construction lines 50 have been drawn in this figure illustrating the path of the portions of the tool C5 which pass through the ends of the work gear axis WA5, and where these lines 50 intersect the axis CA5 of the tool they determine the active width of the cutter which is employed in finishing the gear. The construction lines 51 have been drawn between which lies the active width of the gear.

Referring now to Figure 6, there is illustrated a fragmentary porton of the tool C5 showing one tooth thereof T5. In order to finish the teeth of the gear W5 with the relationship illustrated in Figure 5, the teeth T5 of the tool are modified throughout their active length, or in other words between the lines 51. The modification of the teeth T5 is illustrated as the hollow shown at 52. The portion 53 of the teeth outwardly from the active profile between the lines 51 remains unmodified and this portion of the tool teeth does not enter into the final finishing of the teeth of the gear. The portions 53 might, however, do a certain amount of initial roughing during initial relative traverse prior to the commencement of the final cut to full depth.

Gear shaving by diagonal traverse is characterized largely by the relatively rapid removal of stock from the teeth of the gear and it has been found that ordinarily gears may be shaved in a single reciprocation, that is, a back and forth traverse. The time required to finish gears by employing diagonal traverse is reduced to a fraction of what was previously considered necessary to obtain satisfactory results.

The drawings and the foregoing specification constitute a description of the improved method of shaving gears in such full, clear, concise and exact terms as to enable any person skilled in the art to practice the invention, the scope of which is indicated by the appended claims.

What I claim as my invention is:

1. The method of crown finishing helical gears which comprises meshing a gear member and gear-like tool member with their axes crossed but parallel to a reference plane, driving one of said members in rotation, thereby driving the other of said members in rotation, and providing a relative traverse between said members in a direction which is parallel to said plane, which makes a substantial angle of less than 60° with the axis of said gear, and which is against the helix angle of the engaged teeth of said members, the direction of traverse being such that substantially less than the entire face width of the tool member is brought into action, and employing a tool member the teeth of which are longitudinally concave throughout less than their entire length but including those portions which come into action, the remaining portions of the teeth being unmodified.

2. The method of crown finishing helical gears which comprises meshing a gear member and gear-like tool member with their axes crossed but parallel to a reference plane, driving one of said members in rotation, thereby driving the other of said members in rotation, and providing a relative traverse between said members in a direction which is parallel to said plane, which makes a substantial angle of less than 60° with the axis of said gear, the direction of traverse being such that an intermediate portion substantially less than the entire face width of the tool member is brought into action, and employing a tool member the teeth of which are longitudinally concave throughout the intermediate portion less than their entire length but including those portions which come into action, the remaining portions of the teeth being unmodified.

WALTER S. PRAEG.

REFERENCES CITED

The following references are of record in the file of this patent:

UNITED STATES PATENTS

| Number | Name | Date |
| --- | --- | --- |
| 1,989,650 | Drummond | Jan. 29, 1935 |
| 2,157,981 | Drummond | May 9, 1939 |

FOREIGN PATENTS

| Number | Country | Date |
| --- | --- | --- |
| 480,247 | Great Britain | Feb. 14, 1938 |